(12) United States Patent
Korhonen et al.

(10) Patent No.: US 9,628,291 B2
(45) Date of Patent: Apr. 18, 2017

(54) METHOD FOR AUTOMATIC TUNNELING OF IPV6 PACKETS WITH TOPOLOGICALLY INCORRECT SOURCE ADDRESSES

(75) Inventors: Jouni Korhonen, Riihimäki (FI); Teemu Savolainen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 207 days.

(21) Appl. No.: 14/386,916

(22) PCT Filed: Mar. 23, 2012

(86) PCT No.: PCT/EP2012/055224
§ 371 (c)(1),
(2), (4) Date: Sep. 22, 2014

(87) PCT Pub. No.: WO2013/139399
PCT Pub. Date: Sep. 26, 2013

(65) Prior Publication Data
US 2015/0055507 A1    Feb. 26, 2015

(51) Int. Cl.
*H04L 12/46* (2006.01)
*H04W 8/26* (2009.01)
*H04W 76/02* (2009.01)
*H04W 88/16* (2009.01)
*H04L 12/64* (2006.01)
*H04L 12/66* (2006.01)
(Continued)

(52) U.S. Cl.
CPC ...... *H04L 12/4633* (2013.01); *H04L 12/6418* (2013.01); *H04L 12/66* (2013.01); *H04L 45/02* (2013.01); *H04L 45/72* (2013.01); *H04L 45/74* (2013.01); *H04W 8/26* (2013.01); *H04W 76/022* (2013.01); *H04W 88/16* (2013.01); *H04L 61/2038* (2013.01); *H04L 61/6059* (2013.01)

(58) Field of Classification Search
CPC . H04L 12/4633; H04L 12/6418; H04L 12/66; H04L 45/02; H04L 45/72; H04L 45/74; H04W 8/26; H04W 76/022; H04W 88/16
See application file for complete search history.

(56) References Cited

U.S. PATENT DOCUMENTS

2002/0015396 A1* 2/2002 Jung .................. H04W 8/082
370/338
2002/0196782 A1* 12/2002 Furukawa ........... H04Q 3/0025
370/352
(Continued)

OTHER PUBLICATIONS

Perkins, et al., "Mobility Support in IPv6", Internet Engineering Task Force (IETF), RFC 6275, Jul. 2011.
(Continued)

*Primary Examiner* — Chi H Pham
*Assistant Examiner* — Weibin Huang
(74) *Attorney, Agent, or Firm* — Mintz Levin Cohn Ferris Glovksy and Popeo, P.C.

(57) ABSTRACT

An apparatus and a method are provided, by which a gateway function between a first network and a second network is carried out, a packet is received from a network node located in the second network, wherein the packet comprises a source address which topologically does not belong to the second network, the received packet is encapsulated in a new packet, and the new packet is sent to the first network.

14 Claims, 5 Drawing Sheets

(51) Int. Cl.
*H04L 12/751* (2013.01)
*H04L 12/721* (2013.01)
*H04L 12/741* (2013.01)
*H04L 29/12* (2006.01)

(56) References Cited

U.S. PATENT DOCUMENTS

| | | | |
|---|---|---|---|
| 2005/0177722 A1* | 8/2005 | Vaarala | H04L 63/02 713/168 |
| 2007/0053334 A1* | 3/2007 | Sueyoshi | H04L 12/2856 370/338 |
| 2008/0159227 A1* | 7/2008 | Ulupinar | H04W 8/04 370/331 |

OTHER PUBLICATIONS

R. Baumann et al., "A Protocol for Macro Mobility and Multihoming Notification in Wireless Mesh Networks", *AINAW*, 2007, Advanced Information Networking and Applications Workshops, International Conference on, Advanced Information Networking and Applications Workshops, International Conference on 2007, pp. 34-37, May 21, 2007.

Henderson, "Host Mobility for IP Networks: a Comparision", IEEE Network: The Magazine of Global Internetworking, vol. 17, Issue 6, pp. 18-26, Nov. 2003.

Gundavelli et al., "Proxy Mobile IPv6", Internet Engineering Task Force (IETF), RFC 5213, Aug. 2008.

International Search Report dated Oct. 4, 2012 for PCT application No. PCT/EP2012/055224.

Gundavelli, S. "Reserved IPv6 Interface Identifier for Proxy Mobile IPv6". Internet Engineering Task Force (IETF), V6OPS WG, Dec. 15, 2011. https://tools.ietf.org/pdf/draft-gundavelli-v6ops-pmipv6-address-reservations-06.pdf, last accessed Oct. 17, 2016.

Yourtchenko et al. "Human-safe IPv6: Cryptographic Transformation of Hostnames as a Base For Secure and Manageable Addressing". Internet Engineering Task Force (IETF), Mar. 2, 2012. https://tools.ietf.org/pdf/draft-yourtchenko-opsec-humansafe-ipv6-00.pdf, last accessed Oct. 17, 2016.

\* cited by examiner

METHOD FOR AUTOMATIC TUNNELING OF IPV6 PACKETS WITH TOPOLOGICALLY INCORRECT SOURCE ADDRESSES

RELATED APPLICATION

This application is a national stage application, filed under 35 U.S.C. §371, of PCT Application No. PCT/EP2012/055224, filed on Mar. 23, 2012, the contents of which is incorporated herein by reference in its entirety.

FIELD OF THE INVENTION

The present invention relates to apparatuses, methods and a computer program product for providing Method for automatic tunneling of IPv6 packets with topologically incorrect source addresses.

RELATED BACKGROUND ART

The following meanings for the abbreviations used in this specification apply:
GPRS General Packet Radio Service.
GTP GPRS Tunnelling Protocol
IANA Internet Assigned Numbers Authority
IETF Internet Engineering Task Force
IPv6 Internet Protocol version 6
LMA Local Mobility Anchor
MAC Media access control
MAG Mobile Access Gateway
MN Mobile Node
PMIP6 Proxy Mobile IPv6
RA Router Advertisement Embodiments of the present invention relate to IPv6 addressing in the case of network based mobility framework, when local IPv6 address prefixes are used, and for numbering of very resource constrained nodes, such as battery, memory, and processing power constrained.

A resource constrained node is a device that has less CPU power, battery power, ROM or RAM memory, or resources alike, than what is considered to be common for Internet connected devices. For resource constrained nodes saving of all resources is of extreme importance.

The idea of using local IPv6 prefixes, for offloading and local access when network based mobility is used, is topical.

What comes to resource constrained nodes; the currently available addressing methods are essentially automated address configuration tools, such as Stateless Address Autoconfiguration and Dynamic Host Configuration Protocol version 6. These both are quite complex for resource constrained nodes. Manual IPv6 address configuration is theoretically possibly, but usually not in practice even with PCs, let alone with these resource constrained nodes.

A similar problem may occur when a mobile node (MN) using PMIP6 and having a local address in an old network moves to a new network, wherein in the new network, a new address would be necessary, wherein at least during the address re-configuration, connection loss may occur.

Thus, at present there is no satisfying way of handling addresses in particular of resource constrained nodes (such as machine type communication (MTC) nodes, for example).

SUMMARY OF THE INVENTION

Embodiments of the present invention address these situations and aim to provide a simple solution of handling addresses of resource constrained nodes and to provide a solution for providing mobility support for local IPv6 addresses.

According to a first aspect of the present invention an apparatus is provided which comprises a first interface unit configured to provide connection to a first network; a second interface unit configured to provide connection to a network node located in a second network; a processor configured to carry out a gateway function between the first network and the second network, to receive a packet from the network node via the second interface unit, wherein the packet comprises a source address which topologically does not belong to the second network, to encapsulate the received packet in a new packet, and to send the new packet to the first network via the first interface unit.

According to a second aspect of the present invention an apparatus is provided which comprises a first interface unit configured to provide connection to a first network; a second interface unit configured to provide connection to a second network; and a processor configured to carry out a gateway function between the first network and the second network, to receive an encapsulated packet from the first network via the first interface unit, to decapsulate the received packet, wherein the decapsulated packet comprises a destination address which topologically does not belong to the second network, and to send the decapsulated packet to the destination address to the second network via the second interface unit.

According to a third aspect of the present invention an apparatus is provided which comprises an interface unit configured to provide connection to a first network; and a processor configured to receive a packet from a gateway via the first network via the interface unit, wherein the packet is encapsulated and the gateway is located between the first network and a second network, to record the source address of the packet as the address of the gateway, to decapsulate the received packet, and to record the source address of the decapsulated packet as an address of the network node located in the second network, wherein the address of the network node does topologically not belong to the second network.

According to a fourth aspect of the present invention an apparatus is provided which comprises an interface unit configured to provide connection to a first network; and a processor configured to create a packet having an address of a network node as a destination address, wherein the network node is located in a second network and the address of the network node does topologically not belong to the second network, to encapsulate the created packet into an encapsulated packet having the address of a gateway between the first network and the second network, and to send the encapsulated packet to the gateway.

According to a fifth aspect of the present invention a method is provided which comprises
carrying out a gateway function between a first network and a second network,
receiving a packet from a network node located in the second network, wherein the packet comprises a source address which topologically does not belong to the second network,
encapsulating the received packet in a new packet, and sending the new packet to the first network.

According to a sixth aspect of the present invention a method is provided which comprises
carrying out a gateway function between a first network and a second network,
receiving an encapsulated packet from the first network, decapsulating the received packet, wherein the decapsulated packet comprises a destination address which topologically does not belong to the second network, and sending the decapsulated packet to the destination address to the second network.

According to a seventh aspect of the present invention a method is provided which comprises receiving a packet from a gateway via a first network, wherein the packet is encapsulated and the gateway is located between the first network and a second network, recording the source address of the packet as the address of the gateway, decapsulating the received packet, and recording the source address of the decapsulated packet as an address of the network node located in the second network, wherein the address of the network node does topologically not belong to the second network.

According to an eighth aspect of the present invention a method is provided which comprises creating a packet having an address of a network node as a destination address, wherein the network node is located in a second network and the address of the network node does topologically not belong to the second network, encapsulating the created packet into an encapsulated packet having the address of a gateway between a first network and the second network, and sending the encapsulated packet to the gateway.

Thus, according to embodiments of the present invention, a topological incorrect address of a network node within a network is allowed, and an apparatus such as a gateway encapsulates packets of such a network node. Hence, packets of such a network node can be handled so that there is no need for modifying the address of the network node or the like.

Advantageous developments are defined in the dependent claims.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

As mentioned above, according to embodiments of the present invention, the use of topological incorrect addresses of network nodes is allowed.

However, according to the prior art, generally such a use of topologically incorrect address (e.g. an address which has a network prefix which does not belong to the network in which the node is actually located) leads to problems.

Namely, any node using a source IPv6 address in a network where the address topologically does not belong is facing serious issues: it is not possible to receive packets sent to this IPv6 address and all outgoing packet are likely going to be dropped by entities, such as gateways or routers, that are enforcing use of topologically correct source IP addresses. This is why statically configured IPv6 addresses, or IPv6 addresses a node has configured from other networks, are not possible to use in networks they don't belong to, and hence nodes should always use e.g. Stateless or Stateful Address Autoconfiguration mechanisms to configure addresses topologically belonging to the attached network.

Embodiments of the present invention relate to two quite similar problems that can be solved with essentially the same solution.

Figure 6:
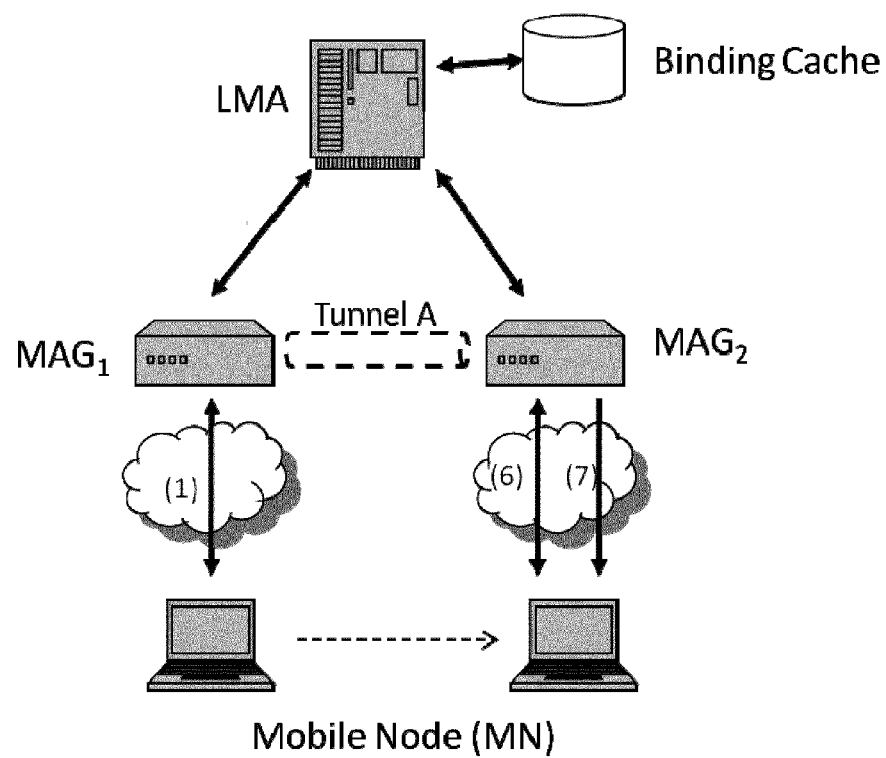
FIG. 6 shows a tunnel between two mobility access gateways.

The problem 1 is about how to best provide local IPv6 addresses when PMIP6 network-based mobility is in use:

For example, FIG. 6 illustrates a way how local IPv6 access can work with PMIP6. In particular, FIG. 6 shows an arrangement comprising a Local Mobility Anchor (LMA) and two Mobile Access Gateways (MAG), MAG1 and MAG2. MAG is a function on an access router that manages the mobility related signaling for a Mobile Node (MN) attached to its access link, e.g. a radio link. LMA is the home agent for a MN in PMIPv6 domain. In this arrangement, it is desired to allow a MN to directly access public Internet or private Intranet via a local MAG (e.g. MAG1 or MAG2) to which it is connected, bypassing the LMA. Assuming a MN tries to connect to a MAG e.g. MAG1. It may initiate an attach request to MAG1. MAG1 may allocate a local prefix (e.g. P1) for the MN and also communicate this prefix to the LMA. A local prefix is a prefix anchored at a MAG. A MN may configure one of its interfaces by using the prefix, e.g. prefix+an interface identifier. Through that interface, the MN may access Internet without routing through the LMA. The prefix may be stored in the Binding Cache of the LMA or other network entity, such as a DHCP (Dynamic Host Configuration Protocol) server.

This solution as shown in FIG. 6 can further be improved with automated tunnelling from the old MAG1 to the new MAG2 so that when the node moves, the connections using local prefixes would not immediately disconnect. It is currently open how this tunnelling would be best set-up, i.e. automatically between MAGs or with help of Local Mobility Anchor. If the PMIPv6 Domain also implements Local Routing MAG-to-MAG tunnelling (tunnel A in FIG. 6), it is possible that old MAG1 and the new MAG2 establish a temporary tunnel between each other during the period the MN uses the old prefix (i.e., the prefix used when attached to MAG1) under the new MAG2. This could allow traffic still using the old prefix reach the MN under the new MAG2. In the arrangement shown in FIG. 6, the tunnel between MAGs and related routing entries get removed immediately when the old prefix expires.

The problem 2 is about constrained devices such as sensors:

Use of automated addressing tools such as Stateless Address Autoconfiguration or DHCPv6 Stateful Address Autoconfiguration requires relatively lot of processing from resource constrained nodes. The nodes needs to learn what is the prefix on the attached network and what address they should configure for themselves. Also in the cases of network renumbering, due administrative or movement events, the nodes need to be able to configure new addresses.

On the other hand, for example IPv6 enabled sensors are often very constrained: they are powered with small batteries and contain only little of ROM to store programs. For these nodes avoidance of address autoconfiguration mechanisms would be beneficial for both battery and memory-wise.

According to certain embodiments of the present invention, the two problems can be solved by allowing topological incorrect addresses within a network. Procedures which are carried out by network elements are described in general in the following by referring to FIGS. 1 to 4.

Figure 1:
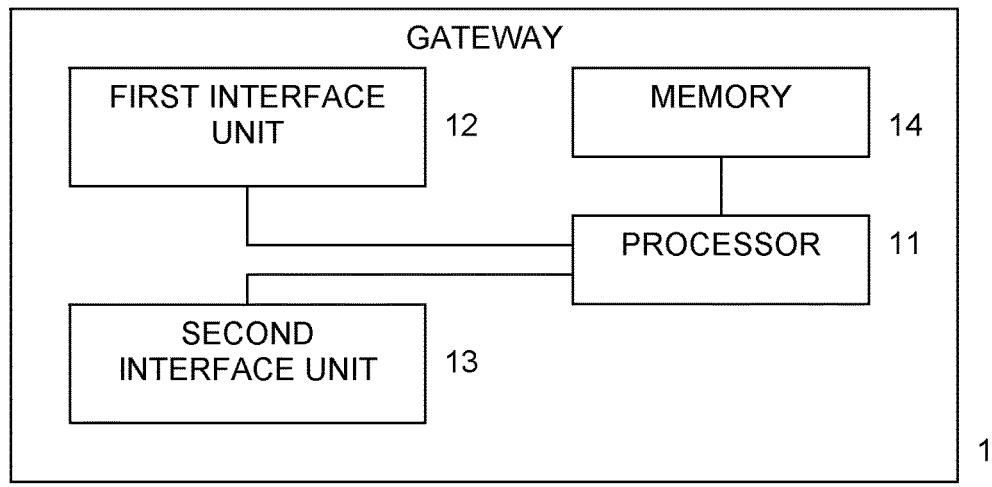
FIG. 1 shows a basic structure of a gateway according to an embodiment of the present invention.

FIG. 1 shows a gateway 1 as an example for an apparatus according to a more general embodiment of the present invention. The apparatus may be the gateway or may be only a part thereof, for example. The gateway 1 comprises a processor 11, a first interface unit 12 and a second interface unit 13. The first interface unit 12 is configured to provide connection to a first network, and the second interface unit 13 is configured to provide connection to a network node located in the second network. The processor 11 is configured to carry out a gateway function between the first network and the second network, via the interface units 12 and 13, and to carry out procedures which are illustrated in the flow chart of FIG. 2A or 2B. Optionally, the gateway 1 may also comprise a memory 14 for storing data and programs, by means of which the processor 11 may carry out its corresponding functions.

Figure 2A:
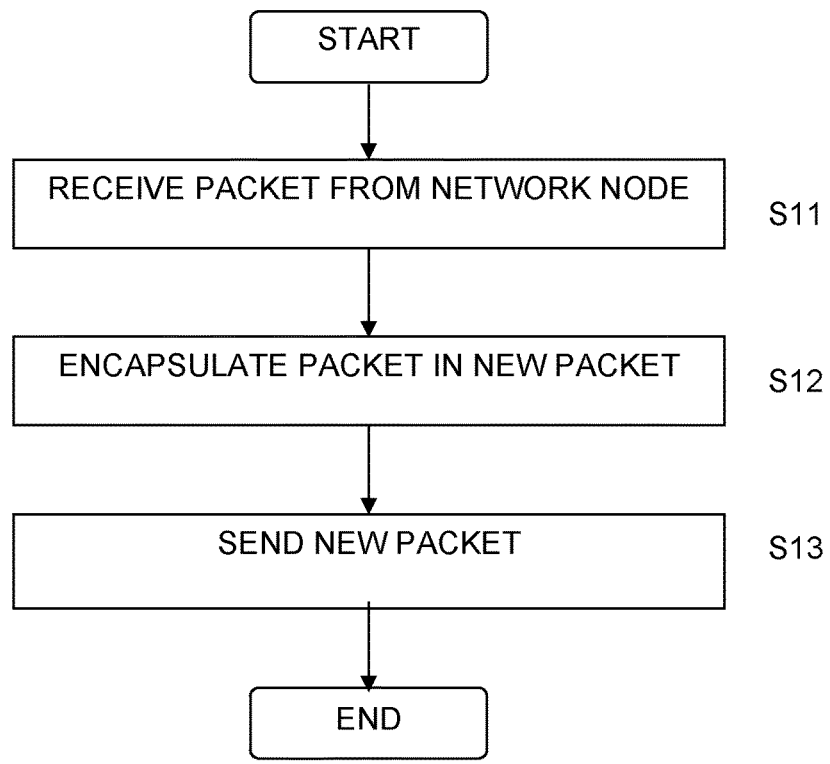
FIGS. 2A and 2B show basic operations of a gateway according to an embodiment of the present invention.

FIG. 2A illustrates a basic operation as carried out by the gateway 1 of FIG. 1, for example, when receiving a packet from the network node 3. In step S11, a packet (e.g., an IPv6 packet) is received from the network node, e.g., via the second interface unit 13, wherein the packet comprises a source address which topologically does not belong to the second network. That is, the network node is an example for a network element described above, for which the use of a topological incorrect address is allowed. In step S12, the received packet is encapsulated in a new packet, and in step S13, the new packet is sent to the first network, e.g., via the first interface unit.

Figure 2B:
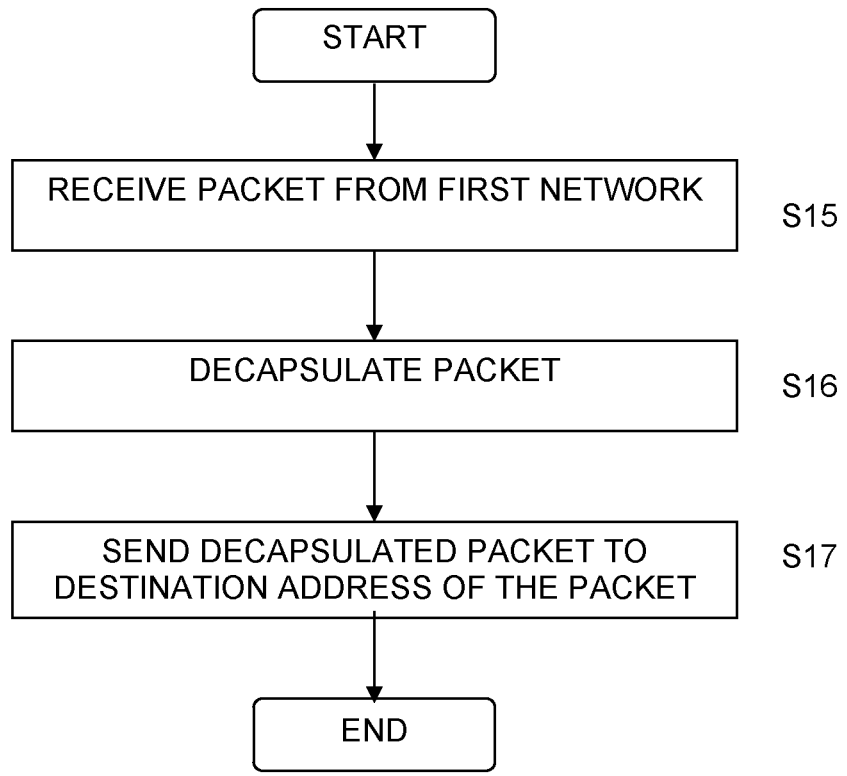

FIG. 2B illustrates a basic operation as carried out by the gateway 1 of FIG. 1, for example, when receiving a packet from the first network, which is destined for the network node and is encapsulated in a packet having the address of the gateway 1 as its destination address. In detail, in step S15, such an encapsulated packet is received from the first network, e.g., via the first interface unit. In step S16, the received packet is decapsulated, wherein the decapsulated packet comprises a destination address which topologically does not belong to the second network. In step S17, the decapsulated packet is sent to the destination address to the second network via the second interface unit.

In this case, the destination address may already be known to the gateway 1 (e.g., stored in the memory or the like), for example since the gateway 1 has already encapsulated packets from the network node according to the flowchart shown in FIG. 2A. Alternatively, the processor may send, after decapsulating the received packet, a multicast message to the second network in order to request a response from the owner of the destination address (i.e., the network node). The decapsulated packet may then be sent only when a response from the owner of the destination address has been received, i.e., the network node is indeed present in the network node.

Hence, according to certain embodiments of the present invention, a packet which contains an address which it topologically incorrect can be handled by encapsulating it in the gateway.

Figure 3:
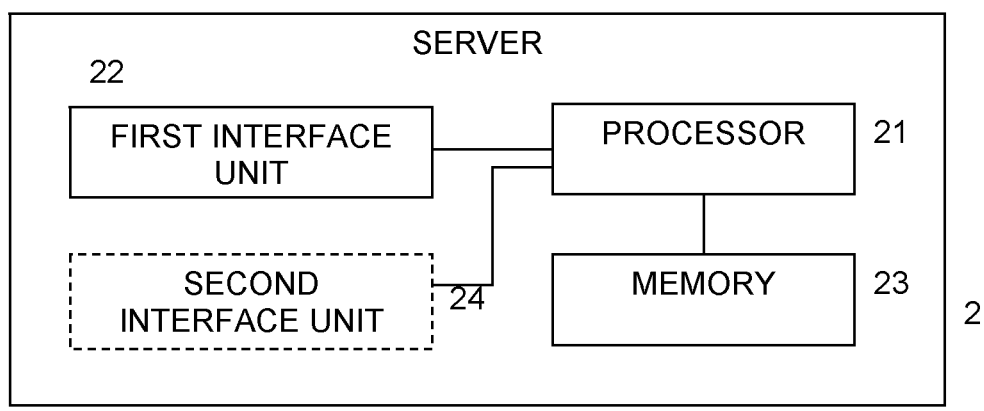
FIG. 3 shows a basic structure of a destination server according to an embodiment of the present invention.

FIG. 3 illustrates a server 2 as an example for an apparatus to which the packet of the network node described above is to be sent. However, the server is only any example and can be any kind of network element to which the packets may be sent, for example MAG1 shown in FIG. 6, a network device to which a sensor would send sensor results or the like.

Figure 4A:
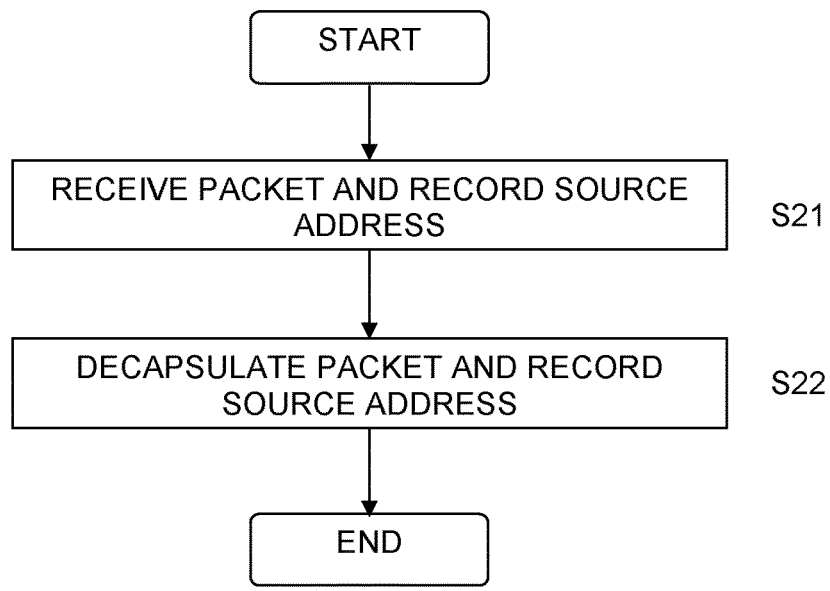
FIGS. 4A and 4B show basic operations of a destination server according to an embodiment of the present invention.
Figure 4B:
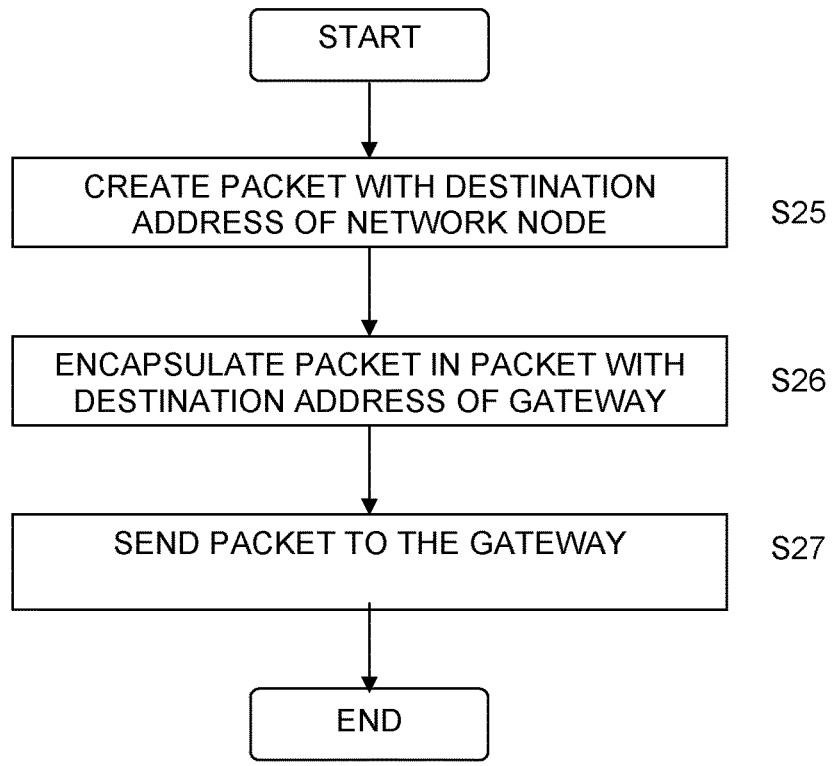

The server comprises a processor 21 and an interface unit 22 configured to provide connection to a first network. The processor 21 is configured to carry out procedures as illustrated in FIG. 4A or FIG. 4B. Optionally, the server 2 may also comprise a memory 23 for storing data and programs, by means of which the processor 21 may carry out its corresponding functions.

FIG. 4A illustrates a basic operation as carried out by the server 2 of FIG. 3, for example. In step S21, a packet is received from a gateway (e.g., gateway 2 or MAG2 shown in FIG. 6) via the first network via the interface unit 22, wherein the packet is encapsulated. The source address of the packet is recorded as the address of the gateway (e.g., MAG2). In step S22, the received packet is decapsulated, and the source address of the decapsulated packet is recorded as an address of the network node located in the second network. Similar as above, the address of the network node does topologically not belong to the second network.

The server 2 may then pass the packet towards further processing within the server, such as for application or for services, or the server may forward the decapsulated packet. For this, the server 2 may have optionally a second interface unit 24, as indicated in FIG. 3 by dashed lines.

That is, after receiving and decapsulating the received packet, the server 2 may use and process the packet internally, may forward it out via the first interface unit 22, or forward it out via the optional second interface unit 24.

FIG. 4B illustrates a basic operation as carried out by the server 2 of FIG. 3, for example. In step S25 a packet having an address of a network node as a destination address is created, wherein the network node is located in a second network and the address of the network node does topologically not belong to the second network. In step S26, the created packet is encapsulated into an encapsulated packet having the address of a gateway between the first network and the second network, and in step S27 the encapsulated packet is sent to the gateway.

The address of the gateway to be used may be known to the server 2 beforehand, or it has been stored when performing the procedures shown in FIG. 4B before, for example.

Hence, according to some embodiments of the present invention, it is explicitly allowed that a network node within a network (the first network as described above) uses an address which topologically does not belong to the network. That is, in IPv6 this means that the network prefix of the address of this network node differs from the network prefix as used in this particular network (i.e., the first network).

Figure 5:
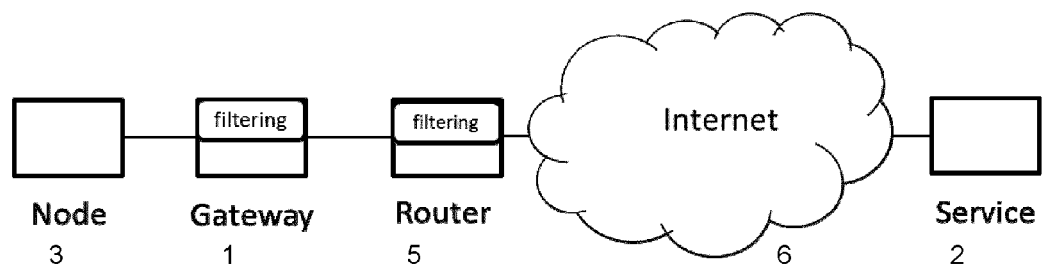
FIG. 5 shows elements involved in certain embodiments of the present invention.

FIG. 5 shows some elements involved in embodiments of the present invention. Node 3 is the entity (network node described above) that ought to have static IPv6 address, i.e., which uses a topological incorrect address. It can be a sensor, a PC, or any kind of host. The gateway 1 is the first hop router from the node, e.g. a mobile handset or e.g. PMIP6 MAG. Router 5 is any router between the gateway 1 and Internet 6, which is an example for the first network described above. Service 2 is the destination for node's communications, and an example for the server 2 described above. "Filtering" in the gateway 1 and the router 2 illustrates places where packets using "invalid" source addresses may be dropped.

Thus, as described above, according to certain embodiments of the present invention, a gateway receiving an IPv6 packet containing source address that "should not" be used in the network "below" the gateway automatically encapsulates IPv6-in-IPv6 encapsulate the packet.

The gateway encapsulates the received IPv6 packet (later inner packet) into a new IPv6 packet (later outer packet) that is using router's uplink interface's IPv6 address as the source address.

The destination address of the newly created outer IPv6 packet can be selected based on the deployment scenario in which the procedure is utilized:

Scenario 1: Routing via the network where the node's source Ipv6 address belongs to.

Figure 7:
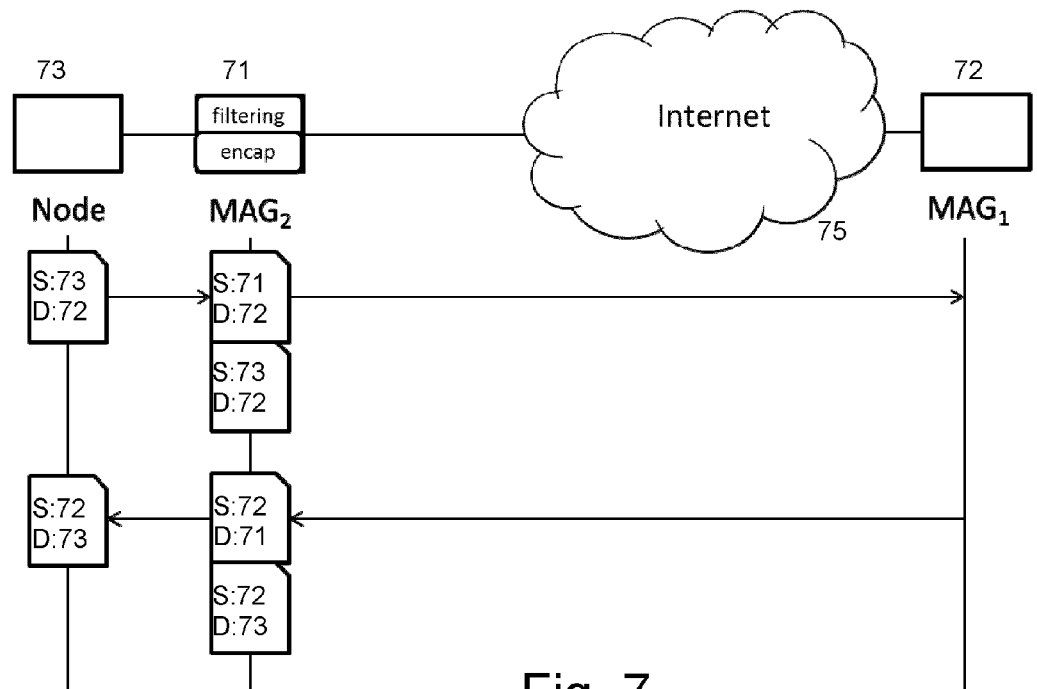
FIG. 7 shows an example for automatic tunneling between two mobility access gateways according to an embodiment of the present invention.

This scenario belongs to the situation as shown in FIG. 6 and is illustrated in FIG. 7, which depicts how a PMIP6 MAG2 tunnels a packet automatically to MAG1. MAG1 will route the inner packet to a local network or to Internet (not shown).

That is, the node 73 (an example for the network node 3 shown in FIG. 5), after attaching from MAG1 denoted by reference sign 72 (an example for the server 2 shown in FIG. 3 or the service node 2 shown in FIG. 5) to MAG2 71 (an example for the gateway 1 shown in FIGS. 1 and 5), tries to access the Internet using its local address. Thus, MAG1 is an example for the server 2 shown in FIG. 3, wherein the second interface unit 24 provides a connection to the local network, for example.

The gateway constructs destination IPv6 address by taking the /64 bit prefix from the source address of the IPv6 packet node sent (i.e. the prefix that is topologically incorrect) and appending it with a 64 bit (well-known) interface identifier of the tunnel endpoint (that is MAG1) at node's home network. This allows automatic "discovery" of the tunnel endpoint's IPv6 address. This well-known interface identifier can be new allocated by IANA, or maybe the fixed Interface Identifier for MAGs (as described, for example, in "Reserved IPv6 Interface Identifier for Proxy Mobile IPv6" (draft-gundavelli-v6ops-pmipv6-address-reservations-06.txt) by S. Gundavelli), or maybe a one built cryptographically (as described, for example, in "Human-safe IPv6: Cryptographic transformation of hostnames as a base for secure and manageable addressing" (draft-yourtchenko-humansafe-ipv6-00) by A. Yourtchenko, S. Asadullah and M. Pisica). For example, if node is using source address 2001:db8:48::aaaa:bbbb, the MAG2 would take the prefix 2001:db8:48:0::/64 and append that with well-known interface identifier, say "abcd", and use the resulting address 2001:db8:48::abcd/128 as the destination address in the outer IPv6 packet.

In the example of FIG. 7, S and D denote source address and destination address respectively. That is, the node 73 uses its source address and the destination address of MAG1 72. MAG2 71 encapsulates the packet by adding a new header which comprises the same destination address (of MAG1 72), but has as the source address the address of MAG2 71. When MAG1 responds, it encapsulates a packet to the node 73, which has the source address of MAG1 72 and the destination address of the node 73, by adding a header which has the same source address but the address of MAG2 71 as the destination address. When receiving the packet, MAG2 71 decapsulates the packet by removing the added header and forwards the decapsulated packet, which has the address of the node 73 as the destination address and the address of MAG1 72, to the node 73.

It is noted that if the MAG2 and MAG1 have IPsec security associations with each other, they might use that to encrypt the node's packets.

This scenario is especially useful for the PMIP6, where the packets using local prefixes have to be routed via the home network, or that the final destination is not able to decapsulate tunnelled IPv6 packets. Use of cryptographically generated Interface Identifiers is specifically interesting in this context, since all MAGs within the PMIPv6 domain would share a domain wide shared secret for the computation of the generation of the Interface Identifier. This means, a random mobile node or a hostile MAG cannot itself spoof wrong source addresses since any MAG in the PMIPv6 domain can verify if the source address is actually valid. This assumes the well-known Interface Identifier is constructed from a shared secret and a domain known only for legitimate MAGs. This does not, of course, prohibit replays if the hostile node can investigate traffic between MAGs' northbound interfaces, which should not be possible without compromising the security of the whole PMIPv6 domain.

It is noted that also in scenario 1, the procedures as described above in connection with FIGS. 2B and 4B are possible. Namely, although technically, the MAG1 has to learn to where the MN has moved, before it can forward any packets to the MN, it is possible that the MAG1 learns the address by some other means than from the uplink packet sent by MN when under MAG2 and that is tunneled to MAG1 (i.e. MAG1 gets mapping based on first uplink packet sent by MN when under MAG2). For example, such a mapping may be supplied by the LMA or the like. In this case, signaling between MAG and LMA signaling could be enhanced so that the old MAG1 learns what is the new MAG2's address, then MAG1 could create this mapping entry automatically (i.e. to know to what gateway to tunnel packets destined to MN—who is no longer under the MAG1) without MN sending any packets first.

Scenario 2: Sending Directly to the Intended Destination

Figure 8:
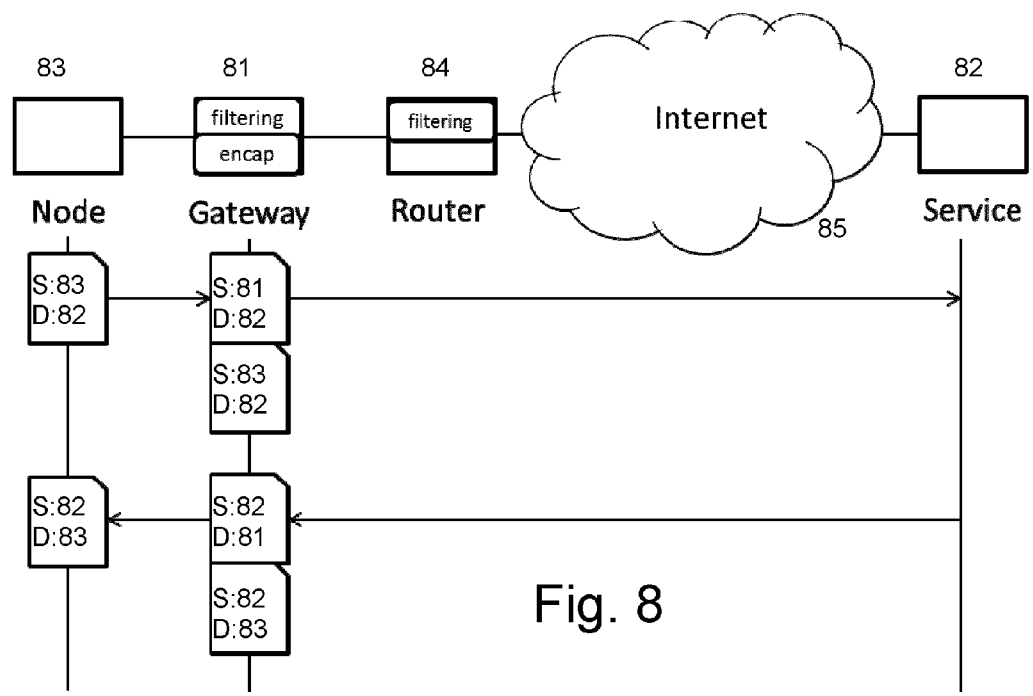
FIG. 8 shows an example for encapsulating of a packet of a network node in a gateway according to an embodiment of the present invention.

This is illustrated in FIG. 8. As shown, a gateway 81 (as an example for the gateway 1 described above) encapsulates an IPv6 packet from the node 83 (as an example for the network node 3 described above), which has a source address of the node 83, and the destination address of the service node 82, to a new IPv6 packet (Source: '81', Destination '82') and forwards the resulting encapsulated packet directly towards Service's IPv6 address '82'. When the service receives encapsulated packet, it removes the outmost header and notices the inner packet is destined for it, and henceforth parses that packet normally. In return direction, when the service 82 has also used encapsulation (encapsulated the IPv6 packet destined for the node 83 to IPv6 packet destinated to gateway 81), the gateway 81 removes the received IPv6 packet's outmost header (comprising desitination address of 81 and source address of 82) and forwards the inner packet to the node 83

Thus, the gateway uses the original IPv6 packet's destination IPv6 address as the destination address for the new packet. This requires that the final destination is able to decapsulate the packet. This scenario is especially useful for constrained sensor's case and routing-wise it may be more optimal, as the packet does not need to traverse via home network.

In both scenarios, according to some embodiments, the gateway records a host route to the global (topologically incorrect) IPv6 addressed used by the node so that when a return packet arrives, the gateway is able to route the packet to the node.

Alternatively, however, according to some other embodiments, the gateway does not record the route. For example, the gateway could work so statelessly so that, when a return packet comes, it asks (via multicast message) from nodes in the second network if someone is the owner of the destination address of the encapsulated packet gateway received. If someone responds to be owner (e.g. via Neighbor Solication/Neigbor Advertisement messages as defined by Ipv6), then the gateway would forward the packet.

In both scenarios described above, according to some embodiments, the gateway records the IPv6 address that was used as destination, and when IPv6-in-IPv6 encapsulated reply packet arrives, the router removes the outmost header and forward the encapsulated packet to the node.

In both scenarios the tunnel endpoint (e.g., server 2, MAG1 72 or service node 82) will receive packets unmodified, only encapsulated, from the nodes. This means the nodes can survive movement without transport session breaks and e.g. can use IP security tunnels bound to node's source address.

When the destination server (e.g., server 2, MAG1 72 or service node 82) replies to the node from which it received IPv6 packet as tunnelled:
1. The server creates an IPv6 packet with the destination's server address as the source IPv6 address and node's IPv6 address as the destination address
2. The server encapsulates the created IPv6 packet into another IPv6 packet, which also has the destination server's IPv6 address as the source, but the gateway's IPv6 address as the destination
3. The server sends the packet When the gateway receives the packet from the destination server, it will:
1. Decapsulate the received packet, i.e. remove the external packet's IPv6 header
2. Forward the inner packet to the node with help of the host route created earlier In the following, an example for an implementation of the above embodiments described above is given:

The gateway has to insert node-specific (full /128 IPv6 address) route in order to be able to forward downlink packets to the global IPv6 address used by the node. This is because, by default, the gateway would forward packets destined to global IPv6 addresses not topologically under the gateway back towards Internet, i.e. send out from gateway's uplink. To tackle this issue, the gateway, when gateway detects uplink packet from node that is using topologically incorrect source IPv6 , it has to create an IPv6 address specific route that points to the local area network through which the node is connected to the gateway. E.g. in Linux the gateway would need to perform command:
ip-6 route add 2001:DB8::1 dev btle0

Where "2001:db8::1" is example of the node's fixed global IPv6 address, "btle0" is example of the interface over which gateway received the packet.

Furthermore, the interface receiving these encapsulated packets have to understand they actually are tunneled (either explicitly IPIP tunnel or using Type 2 Routing Header (as described, for example, in RFC6275: "Mobility Support in IPv6" by C. Perkins, D. Johnson, J. Arkko).

Thus, according to the embodiments as described above, the following advantages can be achieved:

There is no need for explicit tunnel setup protocol.

No breakage for communications using locally anchored prefixes in PMIP6 scenario may occur.

It is not necessary to spend resources on a sensor to support any automated global IPv6 address configuration schemes. This saves a little ROM and RAM on the sensor. It is worth noting that the sensor can have both: static address and automated configuration. The static addressing can be beneficial when talking to home, but automated configuration may be required if sensor needs to talk other sensors or nodes nearby.

Moreover, advantages in power and memory consumption can be achieved since there is less need for signalling and less code for address configuration.

In the case sensors talk only to one destination at the Internet, e.g. to "home", it can be beneficial for home network to uniquely identify sensors based on their source IPv6 addresses.

IP Mobility improvements: sensors do not need to track possible changes of the IPv6 addresses used by the gateway. For the sensors the global address stays same all the time. Furthermore, even sensor's transport layer sessions would survive through gateway's movement and uplink IPv6 address changes, as only the IPv6 address used by the gateway in external header changes, not the IPv6 addresses used by the transport layer sessions.

That is, for example with respect to FIG. 8, the gateway moves so that it changes its address, for example it's source address would change from "81" to "85". Thus, new packet sent by the service node 83 would be encapsulated as:
S:85
D:82
S:83
D:82

That indicates that the internal packet would be using same addresses as before, but external packet's source address would change.

Furthermore, the embodiments are in particular advantageous as machine type communication (MTC) (e.g. sensors sending their reports) is an important topic. Some embodiments can be used as an optimization for this type of communication.

In this way it can be avoided sending periodic Router Advertisement messages to the sensor. This can save a significant amount of network resources as it does not require of moving the sensor from idle mode to active mode just because of a periodic RA message.

It is noted that the embodiments and the present invention in general is not limited to the specific examples given above, and several modifications are possible.

For example, the gateway could perform some sort of selective tunneling. For example, the gateway could decide to tunnel only if predefined rules are met. That is, the gateway could encapsulate the packet received from the node (e.g., node 3 shown in FIG. 5) only when the rules are met. For example, the address of the network node is on some kind of whitelist, or the prefix used by the network node in its source address is on a whitelist (e.g. gateway would provide tunneling only for some source addresses, such as those used within organization), or based on interface (e.g. handset would tunnel packets only if coming from Bluetooth Low Energy interface (used by sensors)), or based on destination addresses (allow tunneling only if destination is whitelisted).

In certain embodiments described above, the network node (e.g., node 83 shown in FIG. 8) was described as a resource constrained node (which may be a device that has less CPU power, battery power, ROM or RAM memory, or resources alike, than what is considered to be common for Internet connected devices). However, the invention is not limited to such a kind of node, and also an ordinary device (i.e., a network node which would have sufficient CPU power, battery power, etc.) may also choose to conserve resources in order to gain benefits, even if less important than for resource constrained devices, and utilize the techniques described in connection with the above embodiments.

Moreover, the embodiments are not limited to IPv6, and can be applied to any kind of network protocol in which a topological incorrect address may occur, for example in which local prefixes are provided for different networks.

Furthermore, the embodiments can be arbitrarily combined. That is, the scenarios 1 and 2 shown in FIGS. 7 and 8 may also be combined for a node. For example, a mobile node, which may apply the tunneling shown in FIG. 7 may also send directly packets to a service node, as shown in FIG. 8, without the need for changing its address.

Thus, according to certain embodiments of the present invention, an apparatus and a method are provided, by which a gateway function between a first network and a second network is carried out, a packet is received from a network node located in the second network, wherein the packet comprises a source address which topologically does not belong to the second network, the received packet is encapsulated in a new packet, and the new packet is sent to the first network.

According to a further aspect of the present invention an apparatus is provided which comprises
  means for carrying out a gateway function between a first network and a second network,
  means for receiving a packet from a network node located in the second network, wherein the packet comprises a source address which topologically does not belong to the second network,
  means for encapsulating the received packet in a new packet, and
  means for sending the new packet to the first network.

According to another aspect of the present invention an apparatus is provided which comprises
  means for carrying out a gateway function between a first network and a second network,
  means for receiving an encapsulated packet from the first network,
  means for decapsulating the received packet, wherein the decapsulated packet comprises a destination address which topologically does not belong to the second network, and
  means for sending the decapsulated packet to the destination address to the second network.

According to a still further aspect of the present invention an apparatus is provided which comprises
  means for receiving a packet from a gateway via a first network, wherein the packet is encapsulated and the gateway is located between the first network and a second network,
  means for recording the source address of the packet as the address of the gateway,
  means for decapsulating the received packet, and
  means for recording the source address of the decapsulated packet as an address of the network node located in the second network, wherein the address of the network node does topologically not belong to the second network.

According to another aspect of the present invention an apparatus is provided which comprises
  means for creating a packet having an address of a network node as a destination address, wherein the network node is located in a second network and the address of the network node does topologically not belong to the second network,
  means for encapsulating the created packet into an encapsulated packet having the address of a gateway between a first network and the second network, and
  means for sending the encapsulated packet to the gateway.

The above described aspects may be modified with the features of the dependent claims.

It is to be understood that any of the above modifications can be applied singly or in combination to the respective aspects and/or embodiments to which they refer, unless they are explicitly stated as excluding alternatives.

For the purpose of the present invention as described herein above, it should be noted that
  an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
  usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;
  a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;
  method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
a first interface unit configured to provide connection to a first network;
a second interface unit configured to provide connection to a network node located in a second network; and
at least one processor and at least one memory including computer program code, wherein the at least one memory and the computer program code are configured to, with the at least one processor, cause the apparatus to at least:
receive a packet from the network node via the second interface unit, wherein the packet comprises a source address which topologically does not belong to the second network,
encapsulate the received packet in a new packet,
create a destination address for the new packet by at least using a network prefix of the source address of the received packet and an interface identifier of a network control node of a network indicated by the network prefix, the interface identifier being at least one of fixed or cryptographically created by at least using a secret known to the apparatus and the network control node, and
send the new packet to the first network via the first interface unit.

2. The apparatus according to claim 1, wherein the apparatus is further configured to at least use an interface address of the second interface unit as the source address of the new packet.

3. The apparatus according to claim 1, wherein the apparatus is further configured to at least record a host route to the source address of the network node within the second network.

4. The apparatus according to claim 3, wherein the apparatus is further configured to at least:
receive a packet from the first network destined to the network node via the first interface unit,
decapsulate the packet, and
route the decapsulated packet to the network node based on the recorded host route.

5. The apparatus according to claim 1, wherein the apparatus is further configured to record the destination address of the received packet of the network node.

6. The apparatus according to claim 1, wherein the apparatus is further configured to at least:
create the destination address of the new packet by using the destination address of the received packet as the destination address of the new packet.

7. The apparatus according to claim 1, wherein the apparatus is further configured to at least perform encapsulating and sending when predefined rules regarding the network node are met.

8. The apparatus according to claim 1, wherein the apparatus is further configured to at least detect whether the source address topologically does not belong to the second network by determining whether the network prefix of the source address differs from the network prefix of the second network.

9. An apparatus comprising:
a first interface unit configured to provide connection to a first network;
a second interface unit configured to provide connection to a second network; and
at least one processor and at least one memory including computer program code, wherein the at least one memory and the computer program code are configured to, with the at least one processor, cause the apparatus to at least:
receive an encapsulated packet from the first network via the first interface unit,
decapsulate the received packet, wherein the decapsulated packet comprises a destination address which topologically does not belong to the second network,
send, after decapsulating the received packet, a multicast message to the second network to request a response from a node at the destination address, and
send the decapsulated packet to the destination address to the second network via the second interface unit, when the response to the request is received by the apparatus.

10. The apparatus according to claim 9, wherein the destination address is an address of a node located in the second network and the destination address is recorded by the processor.

11. The apparatus according to claim 9, wherein the processor is configured to at least perform sending of the decapsulated packet only when predefined rules regarding the network node are met.

12. A method comprising:
receiving a packet from a network node located in the second network, wherein the packet comprises a source address which topologically does not belong to the second network;
encapsulating the received packet in a new packet; and
creating a destination address for the new packet by at least using a network prefix of the source address of the received packet and an interface identifier of a network control node of a network indicated by the network prefix, the interface identifier being at least one of fixed or cryptographically created by at least using a secret known to the apparatus and the network control node; and
sending the new packet to the first network.

13. The method according to claim 12, further comprising:
using an interface address of a second interface unit configured to provide a connection of the apparatus carrying out the method to the second network as the source address of the new packet.

14. A method comprising:
receiving an encapsulated packet from the first network via the first interface unit;
decapsulating the received packet, wherein the decapsulated packet comprises a destination address which topologically does not belong to the second network;
sending, after decapsulating the received packet, a multicast message to the second network to request a response from a node at the destination address; and
sending the decapsulated packet to the destination address to the second network via the second interface unit, when the response to the request is received by the apparatus.

* * * * *